No. 784,422. PATENTED MAR. 7, 1905.
W. H. PARKER.
LOCK WASHER FOR NUTS.
APPLICATION FILED FEB. 13, 1904.

Witnesses
F. J. Veihmeyer
H. M. Tower.

Inventor
WILLIAM HENRY PARKER.
BY Edwin Burr
Attorneys

No. 784,422.                                                          Patented March 7, 1905.

UNITED STATES PATENT OFFICE.

WILLIAM HENRY PARKER, OF MABEN, MISSISSIPPI, ASSIGNOR OF ONE-HALF TO CHARLES N. RIX, OF HOT SPRINGS, ARKANSAS.

LOCK-WASHER FOR NUTS.

SPECIFICATION forming part of Letters Patent No. 784,422, dated March 7, 1905.

Application filed February 13, 1904. Serial No. 193,385.

*To all whom it may concern:*

Be it known that I, WILLIAM HENRY PARKER, a citizen of the United States, residing at Maben, in the county of Oktibbeha and State of Mississippi, have invented certain new and useful Improvements in Lock-Washers for Nuts; and I do hereby declare the following to be a full, clear, and exact description of the invention, such as will enable others skilled in the art to which it appertains to make and use the same.

My invention relates to locks for nuts adapted more particularly for use on railroad cars, rails, &c.

It has for its object to provide a lock which is simple and cheap of manufacture and at the same time will not easily get out of order, but will securely and permanently hold the nut against displacement.

The invention consists in the details of construction and combination of parts hereinafter described, and more specifically pointed out in the claims.

Figure 1:
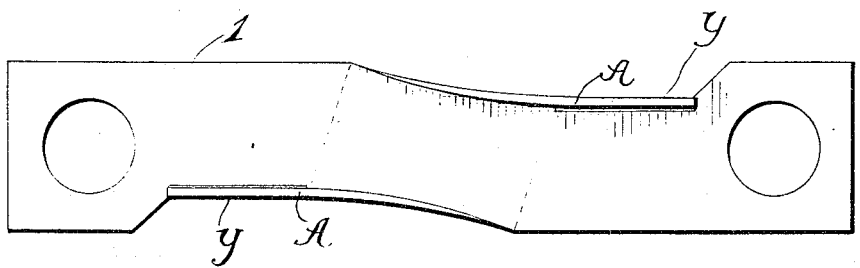
Figure 2:
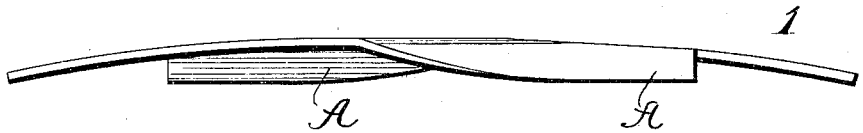

In the accompanying drawings, illustrating the preferred embodiment of my invention, Figure 1 is a plan view of a washer made in accordance with my invention. Fig. 2 is an edge view thereof.

Referring more particularly to the drawings, lips A are cut from the opposite edges of the spring washer-plate 1, the longitudinal slit $y$ being preferably oblique, extending inward toward the center of the washer. The lips A are turned up substantially at right angles with the plate, the curved-up ends of the plate beginning, as shown by the dotted lines in Fig. 1, on the lines from the ends of the longitudinal slit to the opposite extremities of the turned-up portions. It is obvious that as the nuts are screwed on, depressing the ends of the washer-plates, the corners of said nut will engage the lips A, which will act as ratchets, allowing said corners to pass, but not permitting the nuts to be reversed. This engagement by the nuts with the lips A will take place before the nuts have been turned down the required distance, and the ratchet action will continue thereafter until the nuts have been turned "home." This form of washer-plate and nut-lock is especially adapted for use on the angle-bars for connecting rails. This form of lip can be easily operated, as it is very elastic, being pressed outward instead of upward or downward. The tension of the spring being about one hundred pounds on each nut adds materially in securing the nut in position.

It will be noted in connection with my improved lock-washer that by cutting the lip with a longitudinal slit $y$ said lip may be readily depressed throughout its width without scraping or marring the nut or the washer.

It is obvious that these washers may be varied in size and material to suit any requirement, and certain other changes may be made without departing from the spirit or sacrificing the advantages of my invention. I therefore do not limit myself to the details of construction shown and described herein as the preferred embodiment of my invention, but reserve the right to make such changes as fairly fall within the scope of my invention.

I do not herein broadly claim the construction of the locking arm or lip which may be used on plates adapted for single bolts and which is claimed in my copending application, filed December 17, 1904, Serial No. 237,333.

Having thus described my invention, what I claim as new, and desire to secure by Letters Patent, is—

1. In a device of the character described, a curved washer-plate of spring metal having a lip cut from its edge, the end of said lip adapted to abut against the nut, and standing below the surface before the ends of said washer are depressed, but, after said ends are drawn down by screwing down the nut, adapted to stand above the surface and act as a ratchet, allowing the nut to be screwed on but locking it against reverse turning.

2. In a device of the character described, a washer-plate having a central flat portion and its ends curved upward from said flat portion, said plate having a lip formed on each side by cutting a slit from its edge inward and from thence a longitudinal slit, said lip turned upward laterally substantially perpendicular with the plate, the bend and the flat portion of said plate extending from the extremity of the longitudinal slit to the edge of the plate, said lip adapted to act as a ratchet against the corners of the nut, permitting it to be turned on and locking it against reverse turning.

In testimony whereof I affix my signature in presence of two witnesses.

WILLIAM HENRY PARKER.

Witnesses:
 MAURICE L. ROBERTSON,
 JOE SPITZNAGEL.